PROCESS FOR PRODUCING A MAGNETIC RECORDING MATERIAL
Filed Jan. 21, 1963
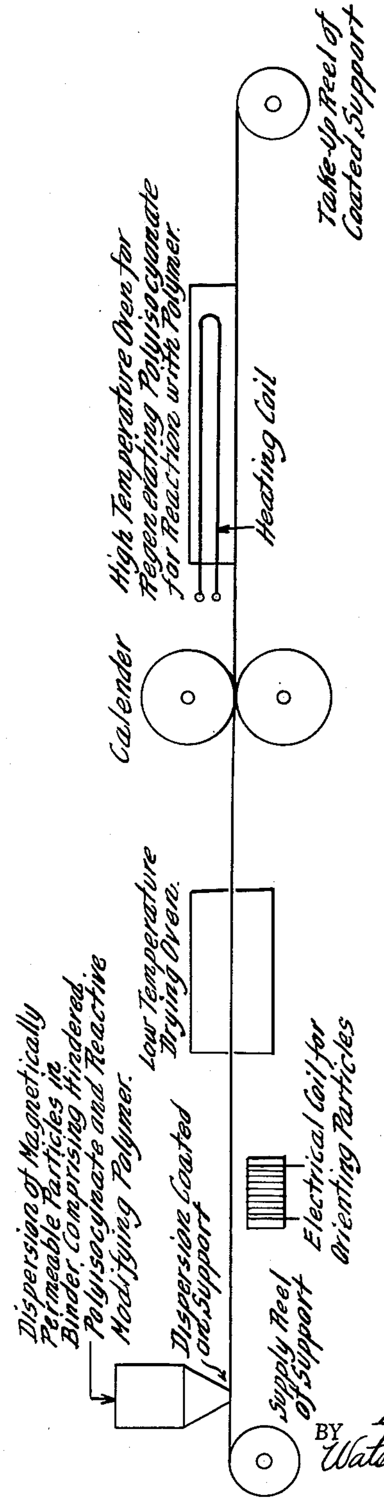
INVENTORS
Serge Hendricx
Johan H. Bisschops
Willy K. Van Landeghem
François P. Loots,
BY Watson, Cole, Grindle & Watson
ATTORNEYS 3,216,846

PROCESS FOR PRODUCING A MAGNETIC RECORDING MATERIAL

Serge Hendrickx, Mortsel-Antwerp, Johan Heinrich Bisschops, Berchem-Antwerp, Willy Karel Van Landeghem, St. Gillis-Waas, and François Pierre Loots, Mortsel-Antwerp, Belgium, assignors to Gevaert Photo-Producten N.V., Mortsel-Antwerp, Belgium, a Belgian company Filed Jan. 21, 1963, Ser. No. 252,589
1 Claim. (Cl. 117—62)

This invention relates to a process for the manufacture of magnetic recording material.

For the magnetic recording of sound signals, data-recording in computers and video-recording use is made of magnetic recording tapes.

Magnetic recording tapes most often consist of a ferromagnetic recording layer which has been coated on a flexible support. This ferromagnetic recording layer normally consists of magnetically permeable particles which are homogeneously distributed in a non-magnetic binding agent.

The support is generally prepared from cellulose triacetate, polyvinyl chloride or polyethylene terephthalate, the latter being biaxially symmetrically or asymmetrically stretched.

The ferromagnetic recording layer is normally applied onto the support from a dispersion of magnetic susceptible particles, most often $\gamma$-$Fe_2O_3$, in a solution of a binding agent, such as polyvinyl acetate, copolymers of vinyl chloride and vinyl acetate, cellulose esters, after-chlorinated polyvinyl chloride, copolymers of butadiene and acrylonitrile or self-hardening polymers.

The ferromagnetic dispersion is for example, applied onto the support by the knife-coating system, the roller coating system or the gravure-offset system. These coating techniques have been described in "Verein Deutscher Ingenieure" vol. 100, No. 13, pp. 545–548.

After coating, the ferromagnetic layer is dried and in some cases calendered.

Since the application field of the magnetic recording material is constantly expanding, the magnetic recording layers have to meet higher requirements with regard to the wear resistance, smoothness and packing density of the magnetically permeable particles.

Wear resistance has become particularly important with the introduction of video-recording. In the course of video-recording, such a great relative speed between the recording heads and the tape is maintained that conventional audio-tapes cannot resist the increased friction. The smallest wearing is already harmful in this recording technique because the ferromagnetic powder, detached by friction, causes dropouts. For the same reason this powder depositing is harmful for data-recording. The adoption of audio-recording has multiplied the importance of the four-track system in wear resistance in this area also, especially because the noise, caused by the frictionally detached powder, is increased as an incident to the decrease of the track width.

The smoothness of the surface is of critical importance to perfect signal reproduction at short wave-lengths because the magnetic flux decreases to a very great extent at increasing distance separating the recording head and the magnetic layer. For instance, it is possible to calculate according to the theories currently in vogue that the distance of $1\mu$ between the tape and the recording head causes a loss in reproduction from 5 to 6 db considering a wave-length of $10\mu$ (9000 Hz. at a tape speed of 9 cm./sec.). Therefore it is quite clear that irregularities of the surface affect very much the reproduction at short wave-lengths and that either local aggregates or dust particles cause drop-outs. A smooth surface has still the further advantage of possessing a reduced abrasion so that the life of the recording head is increased thereby.

By the packing density of the magnetically permeable particles in the ferromagnetic recording layer is to be understood the percentage by volume of ferromagnetic material in the finished ferromagnetic layer.

The packing density of the magnetically permeable particles determines the remanence of the ferromagnetic layer, expressed in flux per sq. mm. of the cross-section of the ferromagnetic layer. The sensitivity of the tape increases with the remanent flux. The amount of the remanent magnetism is a function of the amount of the magnetically permeable particles in the recording layer and of the thickness of the layer in as much as the latter is fully used by the input signals. The thickness of the ferromagnetic layers of the present tapes depends on their use and varies between 8 and $18\mu$. Such thicknesses are fully used only on recording signals of low frequency. On recording signals of high frequency only a small depth inwardly from the surface of the ferromagnetic layer contributes to the reproduction of the input signals. For this reason an increased packing density of the magnetic susceptible particles is particularly important for reproducing high frequency input signals. Confirmation of this conclusion is shown by the fact that when the thickness of the ferromagnetic layer is reduced, the frequency characteristic of the tape is considerably improved.

It is known that ferromagnetic recording layers in which the ferromagnetic powder is dispersed in self-hardening polymers have a high wear resistance, cf. Fritz Winckel, Technik der Magnetspeicher, Springer Verlag, 1960, p. 486. The self-hardening polymers used therefor are characterized by a steric structure. As examples of such resins may be cited urea-formaldehyde resins, melamine resins and reaction products of multibasic isocyanates and polyhydroxy compounds. These latter compounds are described more in detail in the German patent specification 814,225. The application of the "in situ" polymerizing technique in the preparation of ferromagnetic layers, however, show, the disadvantage that rather rough recording layers are formed and, consequently, that the formed recording layers are therefore not applicable in techniques and apparatus which require a high degree of smoothness of the recording layer.

Further, it is generally known that the packing density of the magnetic susceptible particles and the smoothness of the recording layer can be improved by calendering cf. U.S. patent specification 2,525,601, col. 4, lines 38–44. For improving the packing density of the magnetically permeable particles and the smoothness by calendering, however, it is first of all necessary to eliminate any plastic binding agent.

Finally, it is also known that for the orientation of the ferromagnetic particles, more specially when acicular $\gamma$-$Fe_2O_3$ is used as magnetically permeable material, one has to provide a sufficiently soluble binding agent in order to allow the acicular $\gamma$-$Fe_2O_3$ particles, after application of the still wet recording layer, to be sufficiently movable therein.

Now a process has been found according to which the problem of obtaining a magnetic recording layer with oriented magnetically permeable particles, an increased packing density of such particles, a better smoothness and wear resistance, is solved. This process, as illustrated by the accompanying drawing, comprises applying onto a support a dispersion consisting of magnetically permeable particles in a solution of a fully hindered polyisocyanate and a modifying polymer which contains groups capable of reacting with isocyanate groups, orienting the magnetically permeable particles before the hardening reaction of said latent polyisocyanate with said modifying polymer takes place, and calendering the recording layer before and/or during the hardening reaction of said latent polyisocyanate with said polymer.

By fully hindered polyisocyanate is meant the reaction product produced by the addition to any isocyanate group of a polyisocyanate compound of a compound which contains an active methylene group. From this latent polyisocyanate the free polyisocyanate is regenerated by heat, usually by splitting off the compound with an active methylene group by heating between 100 and 200° C. In free state the polyisocyanate then reacts with the active groups, for instance hydroxyl groups, of the modifying polymer.

The orientation of the magnetically permeable particles is preferably carried out in the applied recording layer during the evaporation of the solvent for the modifying polymer.

Calendering is done before the reaction of the regenerated polyisocyanate with the modifying polymer is finished, i.e. before the binding agent has lost its thermoplastic character due to this reaction, and preferably before this reaction is initiated at all.

When an "in situ" polymerizing technique as described in the German patent specification 814,225 is applied, the calendering gives no practical improvement as to the smoothness and packing density of the magnetically permeable particles. This is probably due to the fast reaction of the free polyisocyanate compounds with the polyhydroxy compounds described hereinbefore whereby already during drying and before calendering a completed polymer with steric structure is obtained, i.e. one that has lost its plastic character.

In preparing a recording layer according to the present invention, however, a very efficient packing density or high content of magnetically permeable particles in this layer is obtained.

Such an efficient packing density, i.e. a high content of magnetic susceptible particles, is particularly important in using form-anisotropic ferromagnetic powder, e.g. acicular $\gamma$-$Fe_2O_3$. Due to the disproportional arrangement of the acicular particles, microscopic pores are formed which can occupy up to 50 percentage by volume of the recording layer. The orienting of the particles followed by the calendering of the recording layer involves here a considerable improvement. This is important since in the manufacture of the ferromagnetic recording layers acicular $\gamma$-$Fe_2O_3$ is preferred to the non-acicular $\gamma$-$Fe_2O_3$ on account of its higher coercivity. The orientation of the acicular particles is done during the drying of the magnetic recording layer, at a temperature lower than the reaction temperature of the latent polyisocyanate. When acicular $\gamma$-$Fe_2O_3$ is used then by orienting the particles in the still partially dissolved polymer, a high and uniform orienting effect is obtained which is expressed by the orientation factor. By orientation factor is understood the proportion between the values of the remanence measured in the preferred direction (axis of easy magnetization) and those measured in a perpendicular direction thereto.

In this respect, it has been stated that the reaction of free polyisocyanates with the modifying polymer influences very much the rheological properties of the just applied recording layer, which still contains solvent, and also that the variations of the orientation factor are directly proportional to the variations of the rheological properties. Therefrom, it may be concluded that the process according to the present invention is particularly appropriate for the manufacture of oriented magnetic recording material e.g. in which acicular $\gamma$-$Fe_2O_3$ is incorporated.

The process according to the present invention possesses, moreover, great advantages over the known processes using isocyanates, since the hindered polyisocyanates are non-toxic and can be applied to a support in the form of homogeneous compositions of low viscosity.

According to a preferred embodiment of the invention, a ferromagnetic recording layer is applied onto a flexible support from a dispersion of acicular ferromagnetic $\gamma$-$Fe_2O_3$ in a solution of a latent polyisocyanate and a thermoplastic modifying polymer which is capable of reacting with free isocyanate groups. Before application, the dispersion is freed by filtering from any coarse parts left after grinding.

After filtering, the dispersion is de-aerated whereafter it is applied according to a known process. For orienting the acicular ferromagnetic powder, the recording layer which still contains solvent, soon after its application traverses a solenoid having a magnetic field strength of about 1000 Oe. After the evaporation of the solvent, the recording layer is calendered and at the same time or thereafter heated. Preferably during the calendering, for the purpose of plasticizing the modifying polymer in order to allow the filling up of the openings between the powder particles and the binding agent, the recording layer is heated, taking care, however, that the temperature is left below the reaction temperature of the hindered polyisocyanate.

The regeneration of the hindered polyisocyanates for reaction with the thermoplastic modifying polymer may have already been started by the heat treatment during calendering, so that the compound with active methylene groups splits off, but this start should not be allowed to proceed too far in order to prevent the loss of the plastic character of the layer during calendering.

Preferably the magnetic recording layer is calendered between a very smooth hard metal roller and an elastic paper roller. In this way the recording layer is given a very smooth surface. The smoothness of the surface of the recording layer is equal to the smoothness of the metal calendering roller. The pressure exerted per cm. of recording layer, in pressing the recording layer between the rollers, is relatively low, viz. 10 to 100 kg./cm., i.e. the force exerted by the pressing action of the rollers on each other per cm. length of the nip of the rollers. In using acicular ferromagnetic powder, it is thereby avoided that the needles would break longitudinally as would result in a heterogeneously magnetic character for the tape, and lead to a disturbing echo-effect during the sound reproduction using such kind of tapes. After calendering, the ferromagnetic recording layer is heated above the decomposition temperature of the hindered polyisocyanate. Preferably, the hardening reaction takes place at a temperature which is higher than the softening point of the modifying polymer, which contains reactive groups for a isocyanate compound. Heating may be executed, for instance, by means of an infra-red radiation unit.

In heating the recording layer the temperature at the front side of the support should not be higher than the softening point of the support. Preferably a polyethylene terephthalate support is used which is biaxially symmetrically or asymmetrically stretched.

In order to obtain a better adhesion of the recording layer on the support, the latter is preferably covered with a subbing layer which is firmly attached with one side to the support and with the other side to the recording layer. A subbing layer consisting of a copoly[acrylonitrile/vinylidene chloride] (5/95) is preferred for covering the polyethylene terephthalate support. Said subbing layer possesses a very good affinity for the polyethylene terephthalate support as well as for the ferromagnetic dispersion layer manufactured according to the present invention.

As the modifying polymer in the process according to the present invention, use may be made of any of a large variety of thermoplastic macromolecular compounds which contain groups capable of reacting with isocyanate groups. As examples thereof may be cited those polymers containing free hydroxy and/or carboxyl and/or amino and/or sulfhydroxyl groups. Among the polyhydroxy compounds, cellulose esters and cellulose ethers still containing free hydroxyl groups such as nitro-, acetyl-, propionyl-, butyryl-, acetylbutyryl-, benzyl- and ethylcellulose containing free hydroxyl groups, appeared to be particularly well appropriate. Further, partially saponified polyvinyl esters, soluble reaction products of polyamides and epoxy resins, and polyesters containing hydroxyl groups, such as the soluble reaction products of hydroxyl group-containing polyesters with polyisocyanates, are also appropriate.

Finally, as suitable modifying polymer may further be cited: polyvinyl acetals with a number of free hydroxyl groups, for instance, the non-stoichiometric reaction products of polyvinyl alcohol and butyraldehyde.

As solvents for these modifying polymers can be mentioned: chlorinated lower aliphatic hydrocarbons, lower aliphatic alcohols and aromatic hydrocarbons, such as toluene.

Latent polyisocyanates, which can be used in the present invention, are e.g. the addition products of low molecular alkyl acetoacetates, such as ethyl acetoacetate, and polyisocyanates, such as 1,4-cyclohexyl di-isocyanate or 1,6-hexane di-isocyanate. These latent polyisocyanates, however, show the disadvantage that on heating the recording layer the low molecular alkyl acetoacetate compound escapes on account of its volatility. In the manufacture of the recording layer one has to eliminate this disadvantage because of the resultant pores and irregularities arising in the ferromagnetic recording layer. The escaping of, e.g., ethyl acetoacetate from the recording layer gives also rise to the shrinkage of the recording layer thus causing the tape to curl.

These undesirable phenomena can now be eliminated by using an adduct of a polyisocyanate, such as 2,4-toluene di-isocyanate, with an ester of malonic acid or acetyl acetic acid and a polyalkylene glycol compound, corresponding to the following general formula:

$$HO—(Z—O)_n—R$$

wherein:

Z is an alkylene group such as an ethylene group or an isopropylene group,
R is a group, which is not reactive in respect of an isocyanate, such as an alkyl group, and
*n* is a positive integer from 1 to 50.

These esters are not volatile and are quite compatible with the modifying polymers which are used according to the present invention; moreover they possess an excellent dispersing power for ferromagnetic iron oxide. After splitting off under influence of heat, these esters remain in the recording layer and promote the flexibility of the layer. The poly-isocyanates hindered in this way are stable up to 100–120° C. Above this temperature the active methylene compounds are split off and the liberated polyisocyanates react very fast with the reactive groups of the binding agents.

As an example of the preparation of the above-mentioned non-volatile latent polyisocyanates, the preparation of the latent di-isocyanate, which is produced by addition of 2,4-toluene di-isocyanate and polyethylene glycol monolaurate acetoacetate, is given hereinafter.

1 mol of ethyl acetoacetate is re-esterified wtih 1 mol of polyethylene glycol monolaurate (average molecular weight of 400) in the presence of 0.05% of zinc acetate, calculated on the weight of ethyl acetoacetate, as a catalyst. This reaction mixture is heated at 160° C. for 2 hrs. whilst stirring. After this period the re-esterification is practically finished.

1 mol of the non-volatile acetyl acetic acid ester, prepared by re-esterification and 1 mol of 2,4-toluene di-isocyanate are mixed at room temperature. Whilst stirring 0.01 mol of sodium methylate is added thereto. The reaction is exothermic and is continued until the mixture has reached again the room temperature.

The thus obtained reaction mixture is used in the manufacture of the ferromagnetic recording layer without any further treatment.

The following examples illustrate the manufacture of magnetic recording material according to the present invention. The amounts are expressed in parts by weight.

*Example 1*

A mixture of the following ingredients is ground for 40 hrs. in a ball mill:

| | Parts |
|---|---|
| Acicular $\gamma$-$Fe_2O_3$ | 100 |
| Polyvinyl butyral containing 88% of vinyl butyral groups, 2.5% of vinyl acetate groups and 9.5% of vinyl alcohol groups | 4 |
| 1,2-dichloroethane | 187 |
| Methanol | 40 |

Next, the following products are added to this mixture:

| | Parts |
|---|---|
| Hindered 2,4-toluene di-isocyanate prepared as mentioned above | 6 |
| Polyvinyl butyral containing 88% of vinyl butyral groups, 2.5% of vinyl acetate groups and 9.5% of vinyl alcohol groups | 15 |
| 1,2-dichloroethane | 56 |
| Methanol | 12 |

Grinding is continued for 20 hrs., whereafter the obtained dispersion is filtered and de-aerated. A polyethylene terephthalate support is first covered with a subbing layer consisting of copoly[acrylonitrile/vinylidene chloride] (5/95) (the viscosity of a 20% solution of this copolymer in methyl ethyl ketone amounts to 200–1000 cp. at 20° C.). This copolymer is coated onto the support from a 2.5% solution in a mixture of ethyl acetate and acetone (50/50).

Onto this subbing layer the recording layer from the foregoing prepared $\gamma$-$Fe_2O_3$ dispersion is coated.

Just after this coating the still wet material traverses a solenoid in which a magnetic field strength of 1000 Oe. is excited. After evaporation of the solvents the thickness of the layer amounts to 12$\mu$. The layer has a mat surface i.e. shows the non-smooth appearance of a commonly used tape. The packing density amounts to 30 percentage by volume.

At 80° C. the tape is pressed with its recording layer against a polished chrome covered roller and then calendered between this roller and an elastic paper roller. The force exerted per centimeter of tangent between the rollers amounts to 100 kg./cm. After calendering the surface of the recording layer is as smooth as a mirror and the packing density has increased to 45 percentage by volume.

The calendered recording layer is heated for 1 min. at 140° C. by means of an infra-red radiation unit. The hardening which takes place during this heating confers an excellent wear resistance to the layer without affecting the smoothness and the packing density. The orientation factor of the recording layer amounts to 1.8.

*Example 2*

Example 1 is repeated but now non-acicular $\gamma$-$Fe_2O_3$ is used which is prepared by oxidation of non-acicular iron (II, III) hydroxide ($Fe_3O_4.H_2O$) in an air current at 50° C. The iron (II, III) hydroxide was prepared according to the article by L. Vanino in "Handbuch der präparativen Chemie, Ed. III, p. 629." After drying, the layer has a mat surface and the packing density amounts to 40 percentage by volume. After calendering at 80° C. the surface of the layer is as smooth as a mirror and the packing density amounts to 45 percentage by volume. The after-treatment by heat before hardening confers an excellent wear resistance without causing any modification in the packing density or the smoothness. The orientation factor is 1.0.

*Example 3*

The following mixture is ground for 40 hrs. in a ball mill:

| | Parts |
|---|---|
| Acicular $\gamma$-$Fe_2O_3$ | 100 |
| Zinc naphthenate as wetting agent | 2 |
| 1,2-dichloroethane | 255 |

To the thus obtained dispersion are then added the following ingredients:

| | Parts |
|---|---|
| Hindered 2,4-toluene di-isocyanate prepared as described hereinbefore | 6 |
| Copoly[vinyl chloride/vinyl acetate/vinyl alcohol] (91/3/6) | 15 |

The coating and further working up of the recording layer are carried out in the same way as described in Example 1. The surface of the obtained layer is as smooth as a mirror and is very well resistant to wearing. The packing density amounts to 45 percentages by volume and the orientation factor is 1.8.

*Example 4*

The binding agent for the ferromagnetic powder is prepared as follows:

8 parts of an epoxy resin, obtained by the reaction of epichlorhydrin and 2,2-di(4-hydroxy phenyl)-propane having a molecular weight of 900, and 92 parts of a polyamide resin, marketed by General Mills Inc., Kankakee, Ill., U.S.A., under the name of Versamid 100, are dissolved in 79 parts of isopropanol and heated until the viscosity has reached a constant value.

38 parts of the thus prepared solution are mixed with 4 parts of hindered 2,4-toluene di-isocyanate, prepared as described hereinbefore.

Whilst thoroughly mixing, this composition is added to a dispersion which has been ground for 24 hrs. and which consists of the following ingredients:

| | Parts |
|---|---|
| Acicular $\gamma$-$Fe_2O_3$ | 100 |
| Zinc naphthenate as wetting agent | 2 |
| Toluene | 155 |

Coating and further working up of the recording layer are proceeded with as described in Example 1. The surface of the finished recording layer is as smooth as a mirror, has an excellent wear resistance and a packing degree of 50 percentages by volume. The orientation factor is 1.8.

We claim:

A process for the manufacture of a magnetic recording layer, comprising applying onto a support a dispersion of magnetic susceptible particles in a solvent solution of a modifying polymer which contains functional groups capable of reacting with isocyanate groups and of a hindered polyisocyanate which is an addition product of a polyisocyanate with an ester selected from the group consisting of a polyalkylene glycol ester of malonic acid and a polyalkylene glycol ester of acetylacetic acid, said polyalkylene glycol having the formula $$HO—(Z—O)_n—R$$

wherein:

R is an organic group which is inert with respect to an isocyanate group,

Z is an alkylene group, and

*n* is an integer from 1 to 50, drying the recording layer below the reaction temperature of said addition product, calendering said recording layer and heating said dispersion on said support to a temperature sufficient to split said addition product and regenerate said polyisocyanate in reactive form, thereby causing reaction between said regenerated polyisocyanate and said modifying polymer.

References Cited by the Examiner

UNITED STATES PATENTS

| | | | |
|---|---|---|---|
| 2,454,678 | 11/48 | Smith et al. | 260—45.4 |
| 2,525,601 | 10/50 | Howell. | |
| 2,606,162 | 8/52 | Coffey et al. | 260—45.4 |
| 2,801,990 | 8/57 | Seeger et al. | 260—45.4 |
| 2,806,835 | 9/57 | Nischk et al. | 260—45.4 |
| 2,806,836 | 9/57 | Nischk et al. | 260—45.4 |
| 2,811,493 | 10/57 | Simon et al. | 260—45.4 |
| 2,882,260 | 4/59 | Bartl et al. | 260—45.4 |
| 2,888,433 | 5/59 | Parker | 260—75 |
| 2,978,414 | 4/61 | Harz et al. | |
| 3,099,642 | 7/63 | Holtschmidt et al. | 260—75 |
| 3,144,352 | 8/64 | Talley | 117—138.8 |
| 3,149,995 | 9/64 | Bauer | 177—66 |

FOREIGN PATENTS 814,225 9/51 Germany.

OTHER REFERENCES

Dombrow: "Polyurethanes," N.Y., Reinhold Publ. Corp., 1957, p. 142.

Supplemental Report on Applications on Diisocyanates, FIAT Final Report No. 1301, Sept. 15, 1947, p. 7.

WILLIAM D. MARTIN, *Primary Examiner.*

MURRAY KATZ, *Examiner.*

UNITED STATES PATENT OFFICE

CERTIFICATE OF CORRECTION

Patent No. 3,216,846 November 9, 1965

Serge Hendricx et al.

It is hereby certified that error appears in the above numbered patent requiring correction and that the said Letters Patent should read as corrected below.

In the heading to the printed specification, after line 10, insert the following:

Claims priority, application Belgium, January 22, 1962, 41,312, Patent No. 612,896

Signed and sealed this 9th day of August 1966.

(SEAL)
Attest:

ERNEST W. SWIDER
Attesting Officer

EDWARD J. BRENNER
Commissioner of Patents